United States Patent [19]

Fowler

[11] 4,171,251

[45] Oct. 16, 1979

[54] LASER PHOTOCHEMICAL SEPARATION OF HYDROGEN ISOTOPES

[75] Inventor: Michael C. Fowler, Farmington, Conn.

[73] Assignee: United Technologies Corporation, Hartford, Conn.

[21] Appl. No.: 856,720

[22] Filed: Dec. 1, 1977

[51] Int. Cl.$^2$ ............................................... B01J 1/10
[52] U.S. Cl. ......................... 204/158 R; 204/DIG. 11
[58] Field of Search ................ 204/157.1 R, DIG. 11, 204/158 R

[56] References Cited

U.S. PATENT DOCUMENTS 4,081,339  3/1978  Benson .......................... 204/DIG. 11

Primary Examiner—Howard S. Williams
Attorney, Agent, or Firm—Lawrence A. Cavanaugh

[57] ABSTRACT

A method of separating isotopes of hydrogen utilizing isotopically selective photodissociation of organic acid is disclosed. Specifically acetic or formic acid containing compounds of deuterated and hydrogenated acid is irradiated by radiation having a wavelength in the infrared spectrum between 9.2 to 10.8 microns to produce deuterium hydroxide and deuterium hydride respectively. Maintaining the acid at an elevated temperature significantly improves the yield of isotope separation.

17 Claims, No Drawings

LASER PHOTOCHEMICAL SEPARATION OF HYDROGEN ISOTOPES

BACKGROUND OF THE INVENTION

This invention relates to a method of isotope separation and enrichment, and more particularly, to a method of photochemical dissociation to obtain hydrogen isotopes.

It is well known in the art that lasers may be used to selectively induce chemical reactions which effectively result in isotope separation or enrichment. N. V. Karlov, Applied Optics, Vol. 13, Page 301 (1974) in an article "Laser Induce Chemical Reaction" teaches the utilization of infrared radiation from a high power carbon dioxide laser to excite vibrational energy levels of a particular chemical bond of a selective polyatomic molecule within a sample while simultaneously irradiating the sample with laser radiation in the visible or near ultraviolet spectrum to obtain dissociation. The interaction of the infrared radiation with the molecule produces a cascading excitation of the vibrational energy levels of a selective chemical bond. The article teaches that molecules capable of resonant intractions with carbon dioxide laser radiation include $SF_6$, $BCL_3$, $NH_3$, $N_2F_2$, $PF_5$, $SiH_4$, methyl alcohol $CH_3OH$, a group of halogen-substitute methanes $CH_3F$, $CH_3CL$, $CH_3Br$, ethylene $C_2H_4$ and formaldehyde $H_2CO$.

Robinson et al in U.S. Pat. No. 4,049,515 filed Apr. 22, 1975 discloses a method of obtaining elements enriched in a particular isotope by irradiating a fluid having two or more isotopes of an element with infrared laser radiation having a frequency which vibrationally excites to a first lower vibrational energy level only those molecules of a particular isotope of the element. The intensity of the laser radiation must be sufficient to obtain multiple photon absorption within the first lower vibrational energy level resulting in populating a plurality of higher vibrational energy level by a cascade process until photodissociation occurs. In particular, the patent teaches the utilization of the method to obtain $BCL_3$ highly enriched in $^{10}B$ by irradiating a mixture of natural $BCL_3$ and hydrogen gas with an intense beam of pulse $CO_2$ radiation. Also, $SF_6$ highly enriched in $^{34}S$ is obtained by irradiating a mixture of natural $SF_6$ and hydrogen gas with an intense beam of pulsed carbon dioxide laser radiation.

Marling in U.S. Pat. No. 4,029,557 filed June 17, 1976 discloses the enrichment of carbon, hydrogen and/or oxygen isotopes by means of isotopically selective photo-predissociation of formaldehyde by irradiation with a fixed frequency ion laser.

A method of utilizing an efficient source of laser radiation to dissociate hydrogen isotopes from naturally occurring compounds without requiring laser radiation at two wavelengths is desired. Naturally occurring compounds have an abundance ratio of deuterium to hydrogen in the order of about $1.5 \times 10^{-4}$. Thus the utilization of naturally occurring compounds has the potential for producing an abundant supply of processable deuterium.

SUMMARY OF THE INVENTION

An object of the present invention is the photochemical separation of hydrogen isotopes.

According to the present invention a method for obtaining isotopes of hydrogen by photodissociation of organic acids comprises: providing an organic acid having molecules containing isotopes of hydrogen; providing radiation having a wavelength in the infrared spectrum matched to an absorption line of a chemical bond of the molecule having a hydrogen isotope; interacting the radiation with the acid to excite vibrational energy levels of the chemical bonds of the molecules having hydrogen isotopes; and maintaining the interaction to provide sufficient energy to the chemical bonds of the molecules having hydrogen isotopes to dissociate the molecules from the acid.

A feature of the present invention is the photodissociation of organic acids utilizing radiation from a carbon dioxide or nitrous oxide laser. The laser is capable of providing radiation over the wavelength range of 9.2 to 10.8 microns to match the absorption line of a chemical bond of the molecule having the hydrogen isotope within the acid. The energy levels of the chemical bond are excited by a cascading process until the molecule having the hydrogen isotope photodissociates from the acid. In one embodiment photodissociation of acetic acid with radiation having a wavelength between 10.1 and 10.7 microns and preferably at 10.47 microns yields ketene as a reaction product plus deuterium hydroxide. In a further embodiment formic acid is photodissociated with radiation having a wavelength between 9.25 and 10.0 microns and preferably at 9.62 microns to produce deuterium hydride plus carbon dioxide as a reaction product. Maintaining the acid at a temperature of at least fifty degrees centigrade, to thermally decompose dimers of acid molecules having hydrogen elements to monomers, significantly improves the yield of photodissociated molecules having hydrogen isotopes. The yield is further improved by maintaining the acid at a pressure of less than one hundred torr. The deuterium hydroxide or deuterium hydride produced by the photodissociation process is separated from the unreacted organic acid and the reaction products by conventional methods well known in the art, such as chilling.

The present invention has the advantage of producing deuterium hydroxide or deuterium hydride from inexpensive organic acids. Also, the photodissociation does not require an additional source of energy to provide predissociation.

These and other objects, features, and advantages of the present invention will become more apparent in the light of the following detailed description of the preferred embodiment.

DESCRIPTION OF THE PREFERRED EMBODIMENT

The present invention provides a method for separating molecules having isotopes of hydrogen from organic acids by irradiating the acids with radiation from a carbon dioxide or nitrous oxide laser having a wavelength capable of being varied between 9.2 to 10.8 microns. The radiation from the laser is tuned to a specific wavelength by utilizing a grating, typically within the laser cavity, to match the absorption line of the chemical bond of the isotopic species being irradiated. The interaction of the radiation with the isotopic species produces excitation of the vibrational energy levels of the chemical bond of the molecules. The excitation proceeds by a cascading process to a sufficient level to photodissociate from the acid the molecules having the hydrogen isotopes. The organic acids consist of molecules of hydrogenated and deuterated acid in the naturally occurring abundance ratio of approximately $1.5\times10^{-4}$. When the laser radiation has a wavelength matched to an absorption line of the deuterated acid, absorption within the hydrogenated acid does not occur and the hydrogenated acid remains substantially unexcited. When a sufficient amount of energy is absorbed within the chemical bond of a molecule having a hydrogen isotope, i.e., in the chemical bond of the deuterated acid, the molecule dissociates from the acid to form a dissociation product enriched in a particular isotope, typically deuterium hydroxide or deuterium hydride. The dissociation product is separated from the acid and reaction products formed by the dissociation by conventional means known in the art, such as chilling. Further conventional means known in the art are utilized to enhance the concentration of the dissociation product to obtain deuterium or heavy water.

For the purpose of this disclose the hydrogen element is defined to be $^1H$ while the hydrogen isotope is defined to be $^nH$ where $n>1$ and specifically includes deuterium.

Acetic acid is a naturally occurring organic acid containing deuterated acetic acid, ($CH_3CO_2D$) and hydrogenated acetic acid, ($CH_3CO_2H$) in the ratio $CH_3CO_2D/CH_3CO_2H$ of about $1.5\times10^{-4}$. Photodissociation of the deuterated acetic acid proceeds by the following mechanism.

$$CH_3CO_2D \xrightarrow{h\nu} CH_2CO + DHO \qquad (1)$$

Where $CH_2CO$ is ketene and DHO is deuterium hydroxide. The isotopically enriched product deuterium hydroxide is readily separated from the undissociated acetic acid and the ketene by standard chemical procedures such as cold trapping.

Hydrogenated acetic acid is chemically described as

while deuterated acetic acid is chemically described as

Infrared laser radiation having a frequency of 10.47 microns is nearly matched with the 959 cm$^{-1}$ absorption line of the COD bending vibration mode of the chemical bond of the deuterated acetic acid. The interaction of the laser radiation with the deuterated acetic acid results in the photodissociation of the deuterated acetic acid by the process as shown in equation (1). The hydrogenated acetic acid possesses no vibrational modes in near resonance with the 10.47 micron wavelength of the laser radiation and photodissociation of the COH bending vibrational mode is not expected. Thus in a naturally occurring mixture of deuterated and hydrogenated acetic acid, only deuterium hydroxide plus the reaction product ketene should result from the photodissociation.

Hydrogenated acetic acid is found in nature having dimer and monomer molecular structures with the dimer molecular structure chemically described as

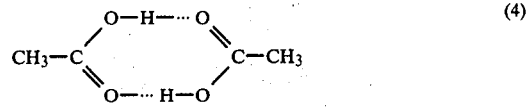

and has a chemical bond with an absorption line for the COH bending vibration mode nearly matched with radiation having a wavelength at 10.47 microns. The interaction of the laser radiation with the dimer results in photodissociation producing the reaction products of ketene and water. The formation of water not only does not yield isotope separation but the water mixes with the DHO from the photodissociation of the deuterated acetic acid as described by equation (1), producing a mixture of ordinary water which results in a reduction in the yield of isotope separation from the photodissociation of the deuterated acetic acid. Since radiation having a wavelength of 10.47 microns is not matched to an absorption line of hydrogenated acetic acid having a monomer structure, it is desirable to eliminate the dimer structure from the hydrogenated acetic acid. Maintaining the acetic acid at an elevated temperature of at least fifty degrees centigrade significantly reduces the number of dimers within the acid. Irradiating naturally occurring acetic acid maintained at a temperature of at least one hundred twenty degrees centigrade significantly reduces the absorption of radiation within the chemical bonds of the hydrogenated acetic acid resulting in a more efficient production of deuterium hydroxide from the photodissociation of the deuterated acetic acid.

The present invention is illustrated by the following example:

EXAMPLE

Deuterated acetic acid maintained at a pressure of 5.8 torr and a temperature of twenty-five (25) degrees centigrade was contained within a cell having barium fluoride windows transparent at frequencies between 9.2 to 10.8 microns. Laser radiation from a carbon dioxide laser was tuned to 10.47 microns with a grating and focused through the window into the acetic acid. The physical condition of the acid depends upon its temperature and pressure and may be in either the liquid or gas phase. At the temperature of twenty-five degrees Centigrade and the pressure of 5.8 torr the acetic acid is completely in the gas phase. The laser was operated in the pulsed mode producing 0.6 joules/pulse, which, when focused into the acid provided a peak focused intensity of approximately $10^9$ watts per square centimeter. After exposure to approximately 3500 pulses, infrared spectroscopy measurements were made of the contents of the cell.

The measurements showed that:

1. A decrease in the concentration of acetic acid after the irradiation. This measurement was made by comparing the intensity of the 1750 cm$^{-1}$ line before and after irradiation.
2. Ketene was present in the cell. This was confirmed by the observation of the 2075 cm$^{-1}$ line.
3. Water having both isotopes of hydrogen was present in the cell. This was confirmed by the observation of the 1205 cm$^{-1}$ line.

Since a reaction proceeding by the mechanism of equation (1) produces both ketene and deuterium hydroxide, the presence of ketene in the cell implies the presence of deuterium hydroxide.

To determine the degree of isotope selectivity in the photodissociation of acetic acid by radiation from a carbon dioxide laser, the absorbance coefficients of deuterated acetic acid and hydrogenated acetic acid were measured as a function of temperature. Absorbance measurements for laser radiation at 10.47 microns were made for the acid originally at a pressure of ten torr and a temperature of twenty degrees centigrade. The results as shown in Table I show the absorbance (A) increasing with temperature for the deuterated acid and decreasing with temperature for the hydrogenated acid. The decrease in absorbance of the hydrogenated acid is due to the thermal decomposition of the dimer molecules to monomers.

TABLE I

| Absorbance (A) | Temperature °C. | | | |
|---|---|---|---|---|
| | 60 | 80 | 100 | 120 |
| Deuterated Acid | .65 | .75 | .85 | .9 |
| Hydrogenated Acetic | .45 | .35 | .29 | .25 |

It is to be recognized by those skilled in the art that the photodissociation of organic acids will require radiation having a wavelength corresponding to the absorption line of the chemical bond of the isotope desired to be separated. Additionally, a sufficient intensity of radiation will be required to dissociate the isotope from the acid, and the acid should be maintained at an elevated temperature to thermally decompose a significant percentage of the dimers into monomers. For example, isotope separation by photodissociation of formic acid containing a naturally occurring ratio of deuterated formic acid and hydrogenated formic acid of approximately $1.5 \times 10^{-4}$, requires laser radiation having a wavelength of between 9.2 and 9.8 microns and preferably of substantially 9.62 microns. In addition, to significantly reduce the number of dimers of hydrogenated formic acid, the temperature of the formic acid must be maintained at a temperature of at least fifty degrees centigrade and preferably one hundred twenty degrees centigrade during the photodissociation process.

Hydrogenated formic acid is chemically described as

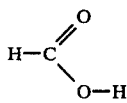  (5)

and deuterated formic acid is chemically described as

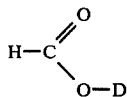  (6)

The photodissociation of deuterated formic acid can process along two reaction paths:

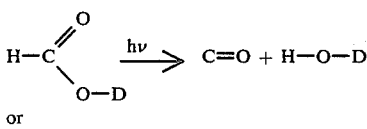  (7)

or

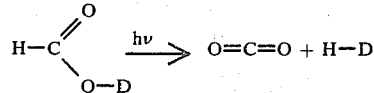  (8)

The isotopically enriched products H-O-D or HD are readily separated from the undissociated formic acid and the reaction products by conventional chemical procedures well known in the art.

It is to be recognized that separation of hydrogen isotopes by photodissociation of other species of organic acids with the use of radiation having a wavelength in the infrared spectrum will be readily apparent from the teachings contained herein by those skilled in the art. Of course, the optimum laser wavelength, energy and power density into the acid as well as the temperature and pressure of the acid will depend upon the properties of the particular organic acid being photodissociated.

It is also to be recognized that isotope separation may be accomplished with radiation provided by a source operating in either the pulsed or continuous mode.

Although the invention has been shown and described with the respect to a preferred embodiment thereof, it should be understood by those skilled in the art that various changes may be made therein without departing from the spirit and scope of the invention.

Having thus described a typical embodiment of the invention that which I claim as new and desire to secure by Letters Patent of the United States is:

1. A method for obtaining isotopes of hydrogen by photodissociation of organic acid comprising:
providing an organic acid having molecules of hydrogenated and deuterated organic acid;
providing radiation having a wavelength in the infrared spectrum matched to an absorption line of a chemical bond of the molecule of deuterated organic acid;
maintaining the organic acid at an elevated temperature to thermally decompose dimer molecules of hydrogenated organic acid having an absorption line matched to the wavelength of the radiation to monomer molecules having an absorption line not matched to the wavelength of the radiation;
interacting the radiation with the organic acid to excite vibrational energy levels of the chemical bonds of the molecules of deuterated organic acid; and
maintaining the interaction to provide sufficient energy to the chemical bonds of the molecules of deuterated organic acid to photodissociate the molecules to form a deuterium enriched reaction product plus a dissociation product.

2. The invention in accordance with claim 1 further including separating the deuterium enriched reaction product from the organic acid and the dissociation reaction product resulting from the photodissociation.

3. The invention in accordance with claim 1 wherein the radiation has a wavelength between 9.2 and 10.8 microns.

4. The invention in accordance with claim 3 wherein the radiation is provided by a carbon dioxide laser.

5. The invention in accordance with claim 3 wherein the radiation is provided by a nitrous oxide laser.

6. The invention in accordance with claim 1 wherein the temperature is at least fifty degrees centigrade.

7. A method for obtaining isotopes of hydrogen by photodissociation of acetic acid comprising:
   providing acetic acid containing molecules of hydrogenated and deuterated acetic acid;
   providing radiation having a wavelength in the infrared spectrum between 10.2 and 10.8 microns to match an absorption line of a chemical bond of the deuterated acetic acid;
   maintaining the acetic acid at an elevated temperature to thermally decompose dimer molecules of hydrogenated acetic acid having an absorption line matched to the wavelength of the radiation into monomer molecules having an absorption line not matched to the wavelength of the radiation;
   interacting the radiation with the acetic acid to excite vibrational energy levels of the chemical bonds of the molecules of deuterated acetic acid; and
   maintaining the interaction to provide sufficient energy to the chemical bonds of the molecules of deuterated acetic acid to photodissociate the molecules to form a deuterium enriched reaction product plus a dissociation product.

8. The invention in accordance to claim 7 wherein the acetic acid is maintained at a temperature of at least fifty degrees centigrade.

9. The invention in accordance with claim 7 wherein the radiation has a wavelength of substantially 10.47 microns.

10. The invention in accordance with claim 7 wherein the deuterium enriched reaction product is deuterium hydroxide and the dissociation product is ketene.

11. The invention in accordance with claim 7 further including separating the deuterium enriched reaction product from the acetic acid and dissociation products resulting from the photodissociation.

12. A method for obtaining isotopes of hydrogen by photodissociation of formic acid comprising:
   providing formic acid containing molecules of hydrogenated and deuterated formic acid;
   providing radiation having a wavelength in the infrared spectrum between 9.2 and 9.8 microns to match an absorption line of a chemical bond of the deuterated formic acid;
   maintaining the formic acid at an elevated temperature to thermally decompose dimer molecules of hydrogenated formic acid into monomer molecules;
   interacting the laser radiation with the formic acid to excite vibrational energy levels of the chemical bonds of the molecules of deuterated formic acid; and
   maintaining the interaction to provide sufficient energy to the chemical bonds of the molecules of deuterated acetic acid to photodissociate the molecules to form a deuterium enriched reaction product plus a dissociation product.

13. The invention in accordance with claim 12 wherein the radiation is provided having a wavelength substantially of 9.62 microns.

14. The invention in accordance with claim 12 wherein the acid is maintained at a temperature of at least fifty degrees centigrade.

15. The invention in accordance with claim 12 wherein the deuterium enriched reaction product is deuterium hydride and the dissociation product is carbon dioxide.

16. The invention in accordance with claim 12 wherein the deuterium enriched reaction product is deuterium hydroxide and the dissociation product is carbon monoxide.

17. The invention in accordance with claim 12 further including separating the deuterium enriched reaction product from the formic acid and dissociation products resulting from the photodissociation.

* * * * *